(12) United States Patent
Letts et al.

(10) Patent No.: US 10,870,987 B1
(45) Date of Patent: Dec. 22, 2020

(54) ISOCYANATE-BASED FOAM CONSTRUCTION BOARDS

(71) Applicant: FIRESTONE BUILDING PRODUCTS COMPANY, LLC, Nashville, TN (US)

(72) Inventors: John B. Letts, Carmel, IN (US); Chunhua Yao, Carmel, IN (US); Michael J. Hubbard, Murfreesboro, TN (US)

(73) Assignee: Firestone Building Products Company, LLC, Nashville, TN (US)

( * ) Notice: Subject to any disclaimer, the term of this patent is extended or adjusted under 35 U.S.C. 154(b) by 17 days.

(21) Appl. No.: 16/209,038

(22) Filed: Dec. 4, 2018

Related U.S. Application Data

(60) Provisional application No. 62/594,222, filed on Dec. 4, 2017.

(51) Int. Cl.
   *B32B 3/00* (2006.01)
   *E04C 2/20* (2006.01)
   (Continued)

(52) U.S. Cl.
   CPC ............ *E04C 2/205* (2013.01); *B32B 5/18* (2013.01); *B32B 27/40* (2013.01); *C08J 9/141* (2013.01); *C08J 9/142* (2013.01); *C08J 9/144* (2013.01); *B32B 2266/0278* (2013.01); *B32B 2266/08* (2013.01); *C08J 2205/052* (2013.01); *C08J 2375/04* (2013.01)

(58) Field of Classification Search
   CPC ....... B32B 5/18; B32B 27/40; B32B 2266/08; B32B 2266/0278; C08J 9/141; C08J 9/142; C08J 9/144; C08J 2205/052; C08J 2375/04; E04C 2/205

USPC .............. 52/309.1, 309.4, 309.7, 408, 783.1; 428/316.6, 319.3, 319.7
See application file for complete search history.

(56) References Cited

U.S. PATENT DOCUMENTS 3,558,531 A  1/1971 Salyer
4,016,323 A * 4/1977 Volovsek ........... B32B 5/18
                                         442/374
(Continued)

FOREIGN PATENT DOCUMENTS

CA  2886641 A1  4/2014
CA  3034242     2/2018
(Continued)

OTHER PUBLICATIONS

International Search Report and Written Opinion for PCT/US2016/064867 dated Mar. 28, 2017, pp. 1-17.
(Continued)

*Primary Examiner* — Brian E Glessner
*Assistant Examiner* — James J Buckle, Jr.
(74) *Attorney, Agent, or Firm* — Thomas R. Kingsbury; Arthur M. Reginelli

(57) ABSTRACT

A construction board comprising (i) a foam body having a generally planar shape with first and second planar surfaces, where said foam body is a closed-cell foam body including pentane and a blowing agent additive that has a Hansen Solubility Parameter that is greater than 17 MPa$^{-0.5}$ contained within the foam body; and (ii) first and second facers attached to said first and second planar surfaces, respectively.

14 Claims, 3 Drawing Sheets

(51) Int. Cl.
  *B32B 5/18* (2006.01)
  *B32B 27/40* (2006.01)
  *C08J 9/14* (2006.01)

(56) References Cited

U.S. PATENT DOCUMENTS

| | | | |
|---|---|---|---|
| 4,425,446 A * | 1/1984 | Malwitz | C08G 18/022 |
| | | | 156/79 |
| 4,572,865 A * | 2/1986 | Gluck | B29C 44/1209 |
| | | | 428/309.9 |
| 5,096,933 A | 3/1992 | Volkert | |
| 5,100,925 A | 3/1992 | Watson et al. | |
| 5,166,182 A | 11/1992 | Blanpied | |
| 5,278,195 A | 1/1994 | Vollkert | |
| 5,336,696 A | 8/1994 | Ashida | |
| 5,416,130 A | 5/1995 | Liman | |
| 5,547,998 A | 8/1996 | White | |
| 5,557,896 A * | 9/1996 | Imeokparia | E04D 11/02 |
| | | | 52/309.6 |
| 5,624,969 A * | 4/1997 | Seifert | C08G 18/282 |
| | | | 521/117 |
| 5,636,492 A * | 6/1997 | Dingler | E04C 2/16 |
| | | | 52/837 |
| 5,801,210 A | 9/1998 | Radovich et al. | |
| 5,891,563 A * | 4/1999 | Letts | B29C 44/326 |
| | | | 428/318.4 |
| 5,981,612 A | 11/1999 | Keppeler et al. | |
| 8,309,619 B2 | 11/2012 | Handa | |
| 9,522,973 B2 | 12/2016 | Combs | |
| 2003/0013777 A1* | 1/2003 | Thornsberry | C08G 18/42 |
| | | | 521/131 |
| 2004/0087674 A1* | 5/2004 | Letts | C08G 18/42 |
| | | | 521/170 |
| 2005/0159500 A1 | 7/2005 | Dreier et al. | |
| 2006/0100295 A1 | 5/2006 | Heraldo et al. | |
| 2008/0097126 A1* | 4/2008 | Karl | C07C 51/02 |
| | | | 562/609 |
| 2008/0313985 A1 | 12/2008 | Duncan | |
| 2009/0247657 A1 | 10/2009 | Kaplan et al. | |
| 2011/0124756 A1* | 5/2011 | Singh | C08G 18/1808 |
| | | | 521/131 |
| 2011/0263732 A1 | 10/2011 | Ramesh | |
| 2014/0066532 A1 | 4/2014 | Combs et al. | |
| 2014/0094530 A1* | 4/2014 | Combs | C08G 18/7664 |
| | | | 521/107 |
| 2015/0329690 A1 | 11/2015 | Mukaiyama | |
| 2016/0090460 A1 | 3/2016 | Singh et al. | |
| 2016/0130213 A1 | 5/2016 | Narayan et al. | |
| 2019/0225766 A1 | 7/2019 | Letts et al. | |

FOREIGN PATENT DOCUMENTS

| | | |
|---|---|---|
| EP | 3095810 A2 | 11/2016 |
| EP | 3500621 A1 | 6/2019 |

OTHER PUBLICATIONS

Zhang, Jiafei. (2013). Study on CO2 Capture USing Thermomorphic Biphasic Solvents with Energy-Efficient Regeneration. Technische Universitat Dortmund (2013).
Barton, Allan M.F. (1991). CRC Handbook of Solubility Parameters and Other Cohesion Parameters, Second Edition. CRC Press (Year: 1991).
International Search Report and Written Opinion for Intl. Appl. No. PCT/US2016/064867 dated Mar. 28, 2017. pp. 1-9.
International Search Report and Written Opinion for Intl. Appl. No. PCT/US2017/047819 dated Nov. 22, 2017, pp. 1-13.
International Search Report and Written Opinion for Intl. Appl. No. PCT/US2018/023134 dated Jul. 31, 2018, pp. 1-14.
U.S. Appl. No. 15/350,634.
U.S. Appl. No. 15/779,887.
U.S. Appl. No. 15/602,852.
U.S. Appl. No. 16/326,394.
U.S. Appl. No. 16/209,038.
U.S. Appl. No. 16/209,218.
U.S. Appl. No. 16/492,487.
U.S. Appl. No. 15/925,592.
U.S. Appl. No. 16/441,406.

* cited by examiner

US 10,870,987 B1

ISOCYANATE-BASED FOAM CONSTRUCTION BOARDS

This application claims the benefit of U.S. Provisional Application Ser. No. 62/594,222, filed on Dec. 4, 2017, which is incorporated herein by reference.

FIELD OF THE INVENTION

Embodiments of the present invention are directed toward construction boards including a physical blowing agent that includes a pentane and a blowing agent additive that provides improved R-Value at a median temperature of 40° F. relative to the R-Value at a median temperature of 75° F.

BACKGROUND OF THE INVENTION

Polyurethane and polyisocyanurate foam construction boards, which may also be referred to as isocyanate-based construction boards, are commonly employed in the construction industry. For example, these foam insulation boards are commonly employed as insulation within flat or low-sloped roofs.

Isocyanate-based construction boards are cellular in nature and typically include an insulating compound trapped within the closed cells of the relatively rigid foam. Many insulating compounds have been used over the years. For example, halogenated hydrocarbons, such as trichlorofluoromethane (CFC-11), were employed. These materials were phased out in favor of hydrochlorofluorocarbons, such as 1,1-dichloro-1-fluoroethane (HCFC-141b). The hydrochlorofluorocarbons were then replaced with hydrocarbons such as various pentane isomers. For example, it is common to produce construction boards by employing n-pentane, isopentane, and/or cyclopentane as blowing agents.

Construction boards are often characterized by one or more technologically important characteristics. For example, the isocyanate-based construction boards may be characterized by an ISO index, which generally refers to the equivalents of NCO groups to isocyanate-reactive groups. Insulation and cover boards having an index of greater than about 200 are desirable because these foam construction boards demonstrate improved dimensional stability and better flame resistance than lower index foams.

Another technologically important characteristic is the insulating property of the foam construction board. This characteristic is typically quantified based upon "R-Value." As a skilled person will appreciate, R-Value represents the ability of a given material to resist heat transfer. This resistance can change with the temperature differential being observed, as well as the median temperature. For example, consumer products are often designated with an R-Value measured at a 40° F. differential and a median temperature of 75° F.; in other words, the insulating value is determined between environments set at 55° F. and 95° F. It is often important to measure R-Value by employing a 40° F. differential at a 40° F. median temperature (i.e. between environments set at 20° F. and 60° F.). Generally speaking, due to thermodynamic phenomena, R-Value is typically higher at lower median temperatures.

Yet another important characteristic of construction boards is dimensional stability, which generally relates to the ability of the board to maintain its shape and volume when subjected to temperature changes. In other words, dimensional stability relates to the degree to which the boards shrink or warp. This is an important consideration because gaps that are formed between adjacent boards cause thermal shorting and undermine the insulating value of a roof system. As the skilled person appreciates, the dimensional stability of construction boards can be determined by ASTM D-2126-09.

Another important characteristic of construction boards is compressive strength, which generally relates to the force required to compromise a construction board. This is an important factor in several respects. First, where a construction board has inferior compressive strength, the construction boards do not adequately withstand forces that are subjected to a roof surface, which can include environmental forces such as snow and hail, as well as foot traffic that is often experienced on a roof. Additionally, construction boards having inferior compressive strength often produce roof systems having inferior wind uplift ratings. For example, where the construction boards are secured to a roof surface using mechanical fasteners, fastener pull through is inversely proportional to compressive strength. As the skilled person appreciates, compressive strength of construction boards can be determined by ASTM D-1621-10.

Another important characteristic is the friability of the construction board. Where the foam body of the construction board is too friable, the usefulness of the construction board can be compromised. For example, facer adhesion to the foam body can be easily compromised where the foam is too friable. Facer delamination can have an adverse impact on dimensional stability, as well as wind uplift especially where a roofing membrane is adhered to the facer.

It is obviously desirable to increase the insulating ability of the foam construction boards without drastically altering other characteristics of the board. In particular, there is a desire to maintain the insulating properties of construction boards over longer periods of time.

SUMMARY OF THE INVENTION

One or more embodiments of the present invention provide a construction board comprising (i) a foam body having a generally planar shape with first and second planar surfaces, where said foam body is a closed-cell foam body including pentane and a blowing agent additive that has a Hansen Solubility Parameter that is greater than 17 MPa$^{-0.5}$ contained within the foam body; and (ii) first and second facers attached to said first and second planar surfaces, respectively.

Yet other embodiments of the present invention provide a construction board prepared by a process comprising (i) providing an A-side reactant stream that includes an isocyanate-containing compound; (ii) providing a B-side reactant stream that includes a polyol, where the B-side reactant stream includes a blowing agent that includes a pentane and a blowing agent additive that has a Hansen Solubility Parameter ($\delta_t$) that is greater than 17 MPa$^{-0.5}$; and (iii) mixing the A-side reactant stream with the B-side reactant stream to produce a reaction mixture.

Still other embodiments of the present invention provide a construction board prepared by a process comprising (i) combining polyol, isocyanate, an acyclic pentane blowing agent, a blowing agent additive that has a Hansen Solubility Parameter ($\delta_t$) that is greater than 17 MPa$^{-0.5}$, and less than 1.5 parts by weight water per 100 parts by weight polyol to form a foam-forming mixture where the ratio of polyol to isocyanate provides a closed-cell foam having an Index of at least 210, and where the amount of acyclic pentane, blowing agent additive, and any water present provide a closed-cell foam having a density of 1.0 to 2.5 lbs/ft$^3$, and where the acyclic pentane and blowing agent additive form a blowing agent mixture, and where the blowing agent mixture includes from about 7 to about 35 mole % blowing agent additive based on the total moles of blowing agent mixture; (ii) depositing the foam-forming mixture on a facer; and (iii) heating the foam-forming mixture to form a closed-cell foam.

DETAILED DESCRIPTION OF ILLUSTRATIVE EMBODIMENTS

Figure 1:
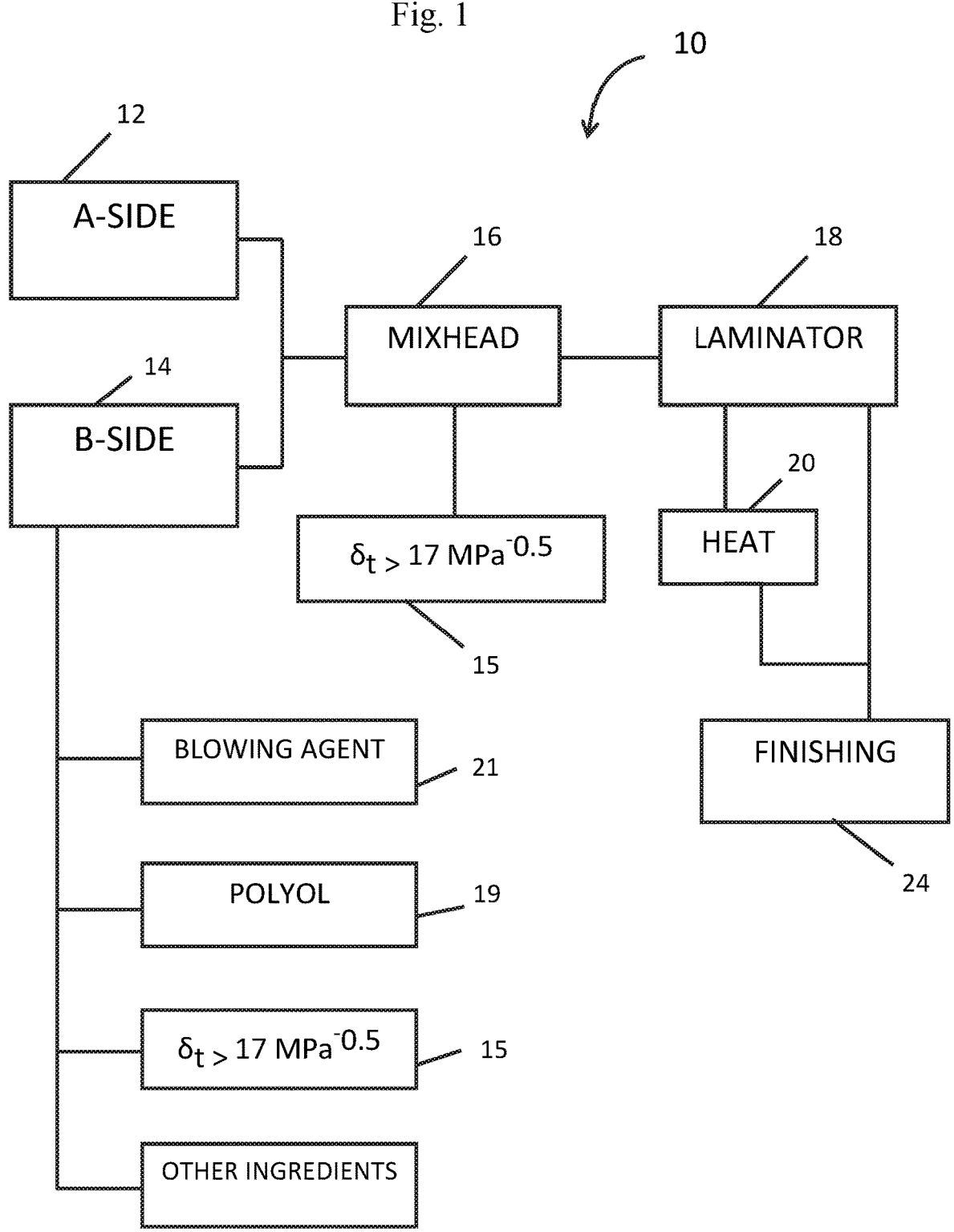
FIG. 1 is a flow chart showing a process of one or more embodiments of the invention.

Embodiments of the present invention are based, at least in part, on the discovery of an isocyanate-based construction board that includes a pentane blowing agent and a blowing agent additive that has a Hansen Solubility Parameter ($\delta_t$) that is greater than 17.0 $MPa^{-0.5}$. A problem that has been observed is that relatively high index foam construction boards that are prepared by employing aromatic polyester polyols and pentane blowing agents have an R-Value at a 40° F. median temperature that is lower than the R-Value at a 75° F. median temperature. In the face of this problem, it has unexpectedly been found that by including the blowing agent additives defined herein together with the pentane blowing agent, the insulating properties of the resultant construction boards can be increased at lower median temperatures (e.g. 40° F.). In fact, it has unexpectedly been found that construction boards of embodiments of the present invention have an R-value at a 40° F. median temperature that is greater than the R-value at a 75° F. median temperature. Still further, the unexpected results observed relative to R-value were especially surprising when viewed in combination with the advantageous balance of properties that have been observed by the construction boards of the present invention.

Process Overview

The construction boards of the present invention may be prepared from isocyanate-based foam including a pentane blowing agent, in particular embodiments an acyclic pentane, and a blowing agent additive as the physical blowing agents. As a skilled person appreciates, the production of foam may include the use of physical blowing agents as well as chemical blowing agents. Typical chemical blowing agents include water as will be described in greater detail below. Unless otherwise specified, for purposes of this specification, reference to the term blowing agents or blowing agent mixture refers to the physical blowing agents, which as suggested above includes the pentane and the blowing agent additive.

As used herein, the term isocyanate-based foam may include polyurethane and polyisocyanurate foams, and terms foam, polyurethane and polyisocyanate may be generally used interchangeably unless specifically indicated. For example, where a technical distinction must be made between polyurethane and polyisocyanurate foam, the ISO index will be used to make any required technical distinctions.

In one or more embodiments, the foam is prepared by mixing a first stream that includes an isocyanate-containing compound with a second stream that includes an isocyanate-reactive compound. Using conventional terminology, the first stream (i.e., the stream including an isocyanate-containing compound) may be referred to as an A-side stream, an A-side reactant stream, or simply an A stream. Likewise, the second stream (i.e., the stream including an isocyanate-reactive compound) may be referred to as a B-side stream, B-side reactant stream, or simply B stream. In one or more embodiments, either stream may carry additional ingredients including, but not limited to, flame-retardants, surfactants, blowing agents, catalysts, emulsifiers/solubilizers, fillers, fungicides, anti-static substances, and mixtures of two or more thereof.

In one or more embodiments, the acyclic pentane blowing agent and a blowing agent additive in accordance with practice of this invention are included within the B-side stream of reactants. In alternate embodiments, the acyclic pentane blowing agent and a blowing agent additive in accordance with practice of this invention are included within the A-side stream of reactants. In yet other embodiments, the acyclic pentane blowing agent and a blowing agent additive in accordance with practice of this invention are included within both the A-side and B-side stream of reactants.

A-Side Stream

In one or more embodiments, the A-side stream may only contain the isocyanate-containing compound. In one or more embodiments, multiple isocyanate-containing compounds may be included in the A-side. In other embodiments, the A-side stream may also contain other constituents such as, but not limited to, flame-retardants, surfactants, blowing agents and other non-isocyanate-reactive components. In one or more embodiments, the complementary constituents added to the A-side are non-isocyanate reactive. And, as suggested above, the A-side may include the acyclic pentane blowing agent and the blowing agent additive in accordance with the present invention. In other embodiments, the A-side is devoid or substantially devoid of the acyclic blowing agent and the blowing agent additive.

Suitable isocyanate-containing compounds useful for the manufacture of polyisocyanurate construction board are generally known in the art and embodiments of this invention are not limited by the selection of any particular isocyanate-containing compound. Useful isocyanate-containing compounds include polyisocyanates. Useful polyisocyanates include aromatic polyisocyanates such as diphenyl methane diisocyanate in the form of its 2,4'-, 2,2'-, and 4,4'-isomers and mixtures thereof. The mixtures of diphenyl methane diisocyanates (MDI) and oligomers thereof may be referred to as "crude" or polymeric MDI, and these polyisocyanates may have an isocyanate functionality of greater than 2. Other examples include toluene diisocyanate in the form of its 2,4' and 2,6'-isomers and mixtures thereof, 1,5-naphthalene diisocyanate, and 1,4' diisocyanatobenzene. Exemplary polyisocyanate compounds include polymeric Rubinate 1850 (Huntsmen Polyurethanes), polymeric Lupranate M70R (BASF), and polymeric Mondur 489N (Bayer).

B-Side Stream

In one or more embodiments, the B-side stream may only include the isocyanate-reactive compound. In one or more embodiments, multiple isocyanate-reactive compounds may be included in the B-side. In other embodiments, the B-side stream may also contain other constituents such as, but not limited to, water, flame-retardants, surfactants, blowing agents and other non-isocyanate-containing components. In particular embodiments, the B-side includes an isocyanate reactive compound, the acyclic pentane blowing agent, and the blowing agent additive. In these or other embodiments, the B-side may also include flame retardants, catalysts, emulsifiers/solubilizers, surfactants, fillers, fungicides, antistatic substances, and other ingredients that are conventional in the art.

An exemplary isocyanate-reactive compound is a polyol. The term polyol, or polyol compound, includes diols, polyols, and glycols, which may contain water as generally known in the art. Primary and secondary amines are suitable, as are polyether polyols and polyester polyols. In particular embodiments, aromatic polyester polyols are employed. Exemplary polyester polyols include phthalic anhydride based PS-2352 (Stepan), phthalic anhydride based polyol PS-2412 (Stepan), teraphthalic based polyol 3522 (Invista), and a blended polyol TR 564 (Huntsman). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one or more embodiments, a polyester polyol is employed. In one or more embodiments, the present invention may be practiced in the appreciable absence of any polyether polyol. In certain embodiments, the ingredients are devoid of polyether polyols.

Catalysts

Catalysts, which are believed to initiate the polymerization reaction between the isocyanate and the polyol, as well as a trimerization reaction between free isocyanate groups when polyisocyanurate foam is desired, may be employed. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris [(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, Emulsifiers and Solubilizers

Surfactants, emulsifiers, and/or solubilizers may also be employed in the production of polyurethane and polyisocyanurate foams in order to increase the compatibility of the blowing agents with the isocyanate and polyol components. Surfactants may serve two purposes. First, they may help to emulsify/solubilize all the components so that they react completely. Second, they may promote cell nucleation and cell stabilization.

Exemplary surfactants include silicone co-polymers or organic polymers bonded to a silicone polymer. Although surfactants can serve both functions, it may also be useful to ensure emulsification/solubilization by using enough emulsifiers/solubilizers to maintain emulsification/solubilization and a minimal amount of the surfactant to obtain good cell nucleation and cell stabilization. Examples of surfactants include Pelron surfactant 9920, Evonik B8489, and GE 6912. U.S. Pat. Nos. 5,686,499 and 5,837,742 are incorporated herein by reference to show various useful surfactants.

Suitable emulsifiers/solubilizers include DABCO Ketene 20AS (Air Products), and Tergitol NP-9 (nonylphenol+9 moles ethylene oxide).

Flame Retardants

Flame Retardants may be used in the production of polyurethane and polyisocyanurate foams, especially when the foams contain flammable blowing agents such as pentane isomers. Useful flame retardants include tri(monochloropropyl) phosphate (a.k.a. tris(cloro-propyl) phosphate), tri-2-chloroethyl phosphate (a.k.a tris(chloro-ethyl) phosphate), phosphonic acid, methyl ester, dimethyl ester, and diethyl ester. U.S. Pat. No. 5,182,309 is incorporated herein by reference to show useful blowing agents.

Pentane Blowing Agents

In one or more embodiments, the blowing agent includes one or more pentane isomers selected from n-pentane, isopentane, cyclopentane and mixtures thereof. In particular embodiments, the pentane blowing agent is an acyclic pentane such as isopentane, n-pentane, or mixtures thereof. In some embodiments, the acyclic pentane is a blend of n-pentane and isopentane. In this respect, U.S. Pat. Nos. 7,612,120, 7,838,568, 8,106,106 and 8,453,390 are incorporated herein by reference.

Blowing Agent Additive

In one or more embodiments, the blowing agent additive is an organic compound having a Hansen Solubility Parameter ($\delta_t$) that is greater than 17.0, in other embodiments greater than 17.5, in other embodiments greater than 18.0, in other embodiments greater than 18.5, in other embodiments greater than 19.0, and in other embodiments greater than 19.5 MPa$^{-0.5}$ at 25° C. In these or other embodiments, the blowing agent additive is an organic compound having a Hansen Solubility Parameter ($\delta_t$) of from about 17.0 to about 35.0, in other embodiments from about 17.5 to about 33.0, in other embodiments from about 18.0 to about 30.0, in other embodiments from about 18.5 to about 28.0, and in other embodiments from about 19.0 to about 26.0 MPa$^{-0.5}$ at 25° C.

As the skilled person appreciates, the Hansen Solubility Parameter is based upon empirical evidence relating to the energy from dispersion forces between molecules ($\delta_d$), energy from dipolar intermolecular forces between molecules ($\delta_p$), and energy from hydrogen bonds between molecules ($\delta_h$). These components contribute to a Hansen Total Cohesion Parameter ($\delta_t$). Unless otherwise stated, reference to Hansen Solubility Parameter ($\delta_t$) will refer to the Hansen Total Cohesion Parameter. Further explanation and the Hansen Solubility Parameters ($\delta_t$) of many common organic molecules are provided in the HANDBOOK OF SOLUBILITY PARAMETERS AND OTHER COHESION PARAMETERS, CRC Press, Pages 76-121, which is incorporated herein by reference.

In one or more embodiments, the blowing agent additive is also characterized by a boiling point, at one atmosphere, of less than 150° C., in other embodiments less than 130° C., in other embodiments less than 115° C., in other embodiments less than 100° C., in other embodiments less than 90° C., and in other embodiments less than 80° C. In these or other embodiments, the blowing agent additive is also characterized by a boiling point, at one atmosphere, that is greater than 5° C., in other embodiments greater than 10° C., in other embodiments greater than 12° C., in other embodiments greater than 15° C., and in other embodiments greater than 18° C. In one or more embodiments, the blowing agent additive is characterized by a boiling point, at one atmosphere, of from about 5° C. to 150° C., in other embodiments from about 10° C. to 130° C., in other embodiments from about 12° C. to 115° C., in other embodiments from about 15° C. to 100° C., and in other embodiments from about 18° C. to 90° C.

In one or more embodiments, the blowing agent additive may be selected from ketones, aldehydes, ethers, esters, halogenated hydrocarbons, and aromatics. In one or more embodiments, the blowing agent additive is a low molecular weight additive. In one or more embodiments, the blowing agent additive is characterized by a molecular weight of less than 150 g/mole, in other embodiments less than 140 g/mole, in other embodiments less than 130 g/mole, in other embodiments less than 120 g/mole, in other embodiments less than 100 g/mole, in other embodiments less than 90 g/mole, in other embodiments less than 80 g/mole, and in other embodiments less than 70 g/mole.

Ketones and Aldehydes

In one or more embodiments, the low molecular weight aldehydes or ketones may be defined by one of the following formulae R(CO)R or R(CO)H, where R and R' are independently a monovalent organic group or where R and R' join to form a divalent organic group.

In one or more embodiments, the monovalent organic groups may be hydrocarbyl groups or substituted hydrocarbyl groups such as, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as a hydrocarbyl group. In one or more embodiments, these groups may also contain heteroatoms such as, but not limited to, nitrogen, boron, oxygen, silicon, sulfur, tin, and phosphorus atoms. In particular embodiments, at least one R group is an ether group, which thereby forms a diether compound.

In one or more embodiments, the divalent organic groups may include hydrocarbylene groups or substituted hydrocarbylene groups such as, but not limited to, alkylene, cycloalkylene, alkenylene, cycloalkenylene, alkynylene, cycloalkynylene, or arylene groups. Substituted hydrocarbylene groups include hydrocarbylene groups in which one or more hydrogen atoms have been replaced by a substituent such as an alkyl group. These groups may also contain one or more heteroatoms such as, but not limited to, nitrogen, oxygen, boron, silicon, sulfur, tin, and phosphorus atoms.

In one or more embodiments, the monovalent organic groups include one to about 12 carbon atoms, in other embodiments from about one to about 6 carbon atoms, in other embodiments from about one to about 3 carbon atoms, and in other embodiments from about one to about 2 carbon atoms. In other embodiments, the divalent organic groups include from one to about 12 carbon atoms, in other embodiments from about 2 to about 8 carbon atoms, and in other embodiments from about 3 to about 5 carbon atoms.

Useful ketones include, but are not limited to, acetone, acetophenone, butanone, cyclopentanone, ethyl isopropyl ketone, 2-hexanone, isophorone, mesityl oxide, methyl isobutyl ketone, methyl isopropyl ketone, 3-methyl-2-pentanone, 2-pentanone, 3-pentanone, and methyl ethyl ketone.

Useful aldehydes include, but are not limited to, formaldehyde, acetaldehyde, propionaldehyde, butyraldehyde, benzaldehyde, cinnamaldehyde, glyoxal, malondialdehyde, and succindialdehyde.

Esters

In one or more embodiments, the ester may be defined by R(CO)OR', where R is hydrogen or a monovalent organic group and R is a monovalent organic group, or where R and R' join to form a divalent organic group. The monovalent and divalent organic groups are defined above together with their respective size, which definition is applicable for this embodiment.

Useful esters include, but are not limited to, methyl formate, ethyl formate, n-propyl formate, isopropyl formate, n-butyl formate, isobutyl formate, t-butyl formate, methyl acetate, ethyl acetate, n-propyl acetate, isopropyl acetate, n-butyl acetate, isobutyl acetate, t-butyl acetate, methyl propanoate, ethyl propanoate, n-propyl propanoate, isopropyl propanoate, n-butyl propanoate, isobutyl propanoate, t-butyl propanoate, methyl butanoate, ethyl butanoate, n-propyl butanoate, isopropyl butanoate, n-butyl butanoate, isobutyl butanoate, and t-butyl butanoate.

Aromatic Hydrocarbon

In one or more embodiments, useful aromatic hydrocarbons include arene and heteroarene compounds. In one or more embodiments, these compounds includes less than 20 carbon atoms, in other embodiments less than 12 carbon atoms, and in other embodiments less than 8 carbon atoms.

Useful arenes include, but are not limited to, benzene, toluene, ethylbenzene, p-1,2-dimethylbenzene, 1,4-dimethylbenzene, 1,4-dimethylbenzene, mesitylene, durene, 2-phenylhexane, biphenyl, phenol, aniline, nitrobenzene, and naphthalene. Useful heteroarenes include, but are not limited to, azepine, oxepine, theipine, pyridine, pyran, and thiopyran.

Halogenated Hydrocarbons

In one or more embodiments, the halogenated hydrocarbon may be defined by the general formula $RX_y$ where R is a monovalent organic group, each X is independently a halogen atom, and y is the number of halogen atoms within the molecule. In one or more embodiments, X is selected from chlorine and fluorine atoms. In one or more embodiments, y is 1 to about 5, in other embodiments y is 2 to 4, and in other embodiments y is 2 to 3. The monovalent and divalent organic groups are defined above together with their respective size, which definition is applicable for this embodiment.

In one or more embodiments, the halogenated hydrocarbon is a halogenated methane, also referred to as a halomethane. In other embodiments, the halogenated hydrocarbon is a halogenated ethane (haloethane), and in other embodiments a halogenated propane (halopropane). In yet other embodiments, the halogenated hydrocarbon is a halogenated olefin (haloolefin).

Examples of useful halomethanes include chlorinated methanes such as, but not limited to, chloroform, methyl chloride, 1,2-dicholorethane, and dichloromethane.

Ethers

In one or more embodiments, the ethers may be defined by the formula R—O—R, where each R is independently a monovalent organic group or each R join to form a divalent organic group. The monovalent and divalent organic groups are defined above together with their respective size, which definition is applicable for this embodiment.

Useful ethers include dihydrocarbyl ether, diethers, and cyclic ethers. Examples of useful dihydrocarbyl ethers include, but are not limited to, diethyl ether, dimethylether, diisopropyl ether, diisobutyl ether, di-n-propyl ether, di-isoamyl ether, di-n-butyl ether, and di-n-hexyl either. Examples of useful cyclic ethers include, but are not limited to, ethylene oxide, tetrahydrofuran (THF), tetrahydropyran, furan, and dihydropyran. Examples of useful diethers include, but are not limited to, dimethoxymethane, dimethoxyethane, dimethoxypropane, dimethoxyisopropane, diethoxymethane, diethoxyethane, diethoxypropane, diethoxyisopropane, dipropoxymethane, dipropoxyethane, dipropoxypropane, dipropoxyisopropane, and diethylene glycol dimethyl ether.

Amount of Reactants/Ingredients

An isocyanurate is a trimeric reaction product of three isocyanates forming a six-membered ring. The ratio of the equivalents of NCO groups (provided by the isocyanate-containing compound or A-side) to isocyanate-reactive groups (provided by the isocyanate-containing compound or B side) may be referred to as the index or ISO index. When the NCO equivalents to the isocyanate-reactive group equivalents is equal, then the index is 1.00, which is referred to as an index of 100, and the mixture is said to be stoiciometrically equal. As the ratio of NCO equivalents to isocyanate-reactive groups equivalents increases, the index increases. Above an index of about 150, the material is generally known as a polyisocyanurate foam, even though there are still many polyurethane linkages that may not be trimerized. When the index is below about 150, the foam is generally known as a polyurethane foam even though there may be some isocyanurate linkages. For purposes of this specification, reference to polyisocyanurate and polyurethane will be used interchangeably unless a specific ISO index is referenced.

In one or more embodiments, the concentration of the isocyanate-containing compound to the isocyanate-reactive compounds within the respective A-side and B-side streams is adjusted to provide the foam product with an ISO index of at least 150, in other embodiments at least 170, in other embodiments at least 190, in other embodiments at least 210, in other embodiments at least 220, in other embodiments at least 225, in other embodiments at least 230, in other embodiments at least 235, in other embodiments at least 240, in other embodiments at least 245, and in other embodiments at least 250. In these or other embodiments, the concentration of the isocyanate-containing compound to the isocyanate-reactive compounds within the respective A-side and B-side streams is adjusted to provide the foam product with an ISO index of at most 400, in other embodiments at most 350, and in other embodiments at most 300. In one or more embodiments, the concentration of the isocyanate-containing compound to the isocyanate-reactive compounds within the respective A-side and B-side streams is adjusted to provide the foam product with an ISO index of from about 150 to about 400, in other embodiments from about 170 to about 350, and in other embodiments from about 190 to about 330, and in other embodiments from about 220 to about 280.

In one or more embodiments, the amount of physical blowing agent (i.e., acyclic pentane and blowing agent additive) used in the manufacture of polyisocyanurate foam construction board according to the present invention may be described with reference to the amount of isocyanate-reactive compound employed (e.g., polyol). For example, in one or more embodiments, at least 12, in other embodiments at least 14, and in other embodiments at least 18 parts by weight physical blowing agent per 100 parts by weight of polyol may be used. In these or other embodiments, at most 40, in other embodiments at most 36, and in other embodiments at most 33 parts by weight physical blowing agent per 100 parts by weight of polyol may be used. In one or more embodiments, from about 12 to about 40, in other embodiments from about 14 to about 36, and in other embodiments from about 18 to about 33 of physical blowing agent per 100 parts by weight of polyol may be used.

In one or more embodiments, the amount of physical blowing agent (i.e., acyclic pentane and blowing agent additive), optionally together with any chemical blowing agent employed, used in the manufacture of polyisocyanurate foam construction board according to the present invention may be described with reference to the density of the resulting foam. In other words, the skilled person appreciates that the amount of blowing agent employed has a direct impact on the density of the foam produced, and these amounts can be determined without undue calculation or experimentation. Accordingly, in one or more embodiments, the amount of blowing agent employed (both physical and chemical blowing agent) is tailored to produce a foam having a density (as determined by ASTM C303-10) of from about 1.0 to about 2.5 lbs/ft$^3$, in other embodiments from about 1.2 to about 2.2 lbs/ft$^3$, in other embodiments from about 1.4 to about 2.0 lbs/ft$^3$, and in other embodiments from about 1.5 to about 1.8 lbs/ft$^3$. In particular embodiments, the amount of blowing agent employed is tailored to produce a foam having a density of less than 2.5 lbs/ft$^3$, in other embodiments less than 2.2 lbs/ft$^3$, in other embodiments less than 2.0 lbs/ft$^3$, and in other embodiments less than 1.8 lbs/ft$^3$.

In one or more embodiments, the amount of the blowing agent additive may be described as a percentage of the amount of physical blowing agent employed (in other words, the amount of blowing agent additive relative to the acyclic pentane and the blowing agent additive combined). Thus, in one or more embodiments, the amount of blowing agent additive included within the foam-forming ingredients is greater than 5 wt. %, in other embodiments greater than 10 wt. %, and in other embodiments greater than 12 wt. % based upon the entire weight of the physical blowing agent. In these or other embodiments, the amount of blowing agent additive is less than 50 wt. %, in other embodiments less than 25 wt. %, and in other embodiments less than 20 wt. % based upon the entire weight of the physical blowing agent, is included within the foam-forming ingredients. In one or more embodiments, from about 5 to about 50 wt. %, in other embodiments from about 10 to about 25 wt. %, and in other embodiments from about 12 to about 20 wt. % blowing agent additive, based upon the entire weight of the physical blowing agent, is included within the foam-forming ingredients. It should be understood that these amounts can likewise be employed even where the blowing agent additive are introduced directly to the mixhead, as will be explained in greater detail below.

Since the molecular weight of the various blowing agent additives may vary, it is also useful to describe the amount of blowing agent additive employed in the present invention as a mole percentage of the amount of physical blowing agent. In one or more embodiments, the amount of blowing agent additive included within the foam-forming ingredients is greater than 5 mole %, in other embodiments greater than 10 mole %, and in other embodiments greater than 12 mole % based upon the entire moles of the physical blowing agent. In these or other embodiments, the amount of blowing agent additive is less than 50 mole %, in other embodiments less than 25 mole %, and in other embodiments less than 20 mole % based upon the entire moles of the physical blowing agent, is included within the foam-forming ingredients. In one or more embodiments, from about 5 to about 50 mole %, in other embodiments from about 7 to about 35 mole %, in other embodiments from about 10 to about 30 mole %, and in other embodiments from about 12 to about 27 mole % blowing agent additive, based upon the entire moles of the physical blowing agent, is included within the foam-forming ingredients.

In one or more embodiments, the amount of the blowing agent additive may be described as a function of the weight of the polyol. Thus, in one or more embodiments, the amount of blowing agent additive included within the foam-forming ingredients is greater than 0.9 parts by weight, in other embodiments greater than 2.0 parts by weight, and in other embodiments greater than 3.3 parts by weight per 100 parts by weight polyol. In these or other embodiments, the amount of blowing agent additive is less than 10.0, in other embodiments less than 6.0, and in other embodiments less than 5.0 parts by weight blowing agent additive per 100 parts by weight polyol. In one or more embodiments from about 0.9 to about 10.0, in other embodiments from about 2.0 to about 6.0, and in other embodiments from about 3.3 to about 5.0 parts by weight blowing agent additive per 100 parts by weight polyol is included within the foam-forming ingredients.

In one or more embodiments, the amount of the blowing agent additive may be described in terms of a molar ratio of blowing agent additive to acyclic pentane, which is defined in terms of the moles of blowing agent additive to moles of acyclic pentane. Thus, in one or more embodiments, the molar ratio of blowing agent additive to acyclic pentane is greater than 1:20, in other embodiments greater than 1:10, and in other embodiments greater than 1:4. In these or other embodiments, the molar ratio of blowing agent additive to acyclic pentane is less than 1:1, in other embodiments less than 1:1.5, and in other embodiments less than 1:2. In one or more embodiments, the molar ratio of blowing agent additive to acyclic pentane is from about 1:20 to about 1:1, in other embodiments from about 1:10 to about 1:1.5, and in other embodiments from about 1:4 to about 2:1. It should be understood that these amounts can likewise be employed even where the blowing agent additive are introduced directly to the mixhead, as will be explained in greater detail below.

In one or more embodiments, the amount of the blowing agent additive may be described as a function of the weight of the polyol. Thus, in one or more embodiments, the amount of blowing agent additive included within the foam-forming ingredients is greater than 0.9, in other embodiments greater than 2.0, and in other embodiments greater than 3.3 moles of blowing agent additive per 100 grams of polyol. In these or other embodiments, the amount of blowing agent additive is less than 10.0, in other embodiments less than 6.0, and in other embodiments less than 5.0 moles of blowing agent additive per 100 grams of polyol. In one or more embodiments from about 0.9 to about 10.0, in other embodiments from about 2.0 to about 6.0, and in other embodiments from about 3.3 to about 5.0 moles of blowing agent additive per 100 grams of polyol is included within the foam-forming ingredients.

In one or more embodiments, the physical blowing agent is devoid or substantially devoid of cyclopentane, where substantially devoid refers to that amount or less of cyclopentane that does not have an appreciable impact on the practice of the invention and/or the advantageous properties observed in the construction boards of this invention. In one or more embodiments, the blowing agent employed in practicing the present invention includes less than 10 mole percent, in other embodiments less than 5 mole percent, and in other embodiments less than 1 mole percent cyclopentane based upon the entire blowing agent mixture, which refers to the physical blowing agents (i.e. the acyclic pentane and the blowing agent additive).

In one or more embodiments, the amount of surfactant (e.g., silicone copolymer) used in the manufacture of polyisocyanurate foam construction board according to the present invention may be described with reference to the amount of isocyanate-reactive compound employed (e.g. polyol). For example, in one or more embodiments, at least 1.0, in other embodiments at least 1.5, and in other embodiments at least 2.0 parts by weight surfactant per 100 parts by weight of polyol may be used. In these or other embodiments, at most 5.0, in other embodiments at most 4.0, and in other embodiments at most 3.0 parts by weight surfactant per 100 parts by weight of polyol may be used. In one or more embodiments, from about 1.0 to about 5.0, in other embodiments from about 1.5 to about 4.0, and in other embodiments from about 2.0 to about 3.0 of surfactant per 100 parts by weight of polyol may be used.

In one or more embodiments, the amount of flame retardant (e.g., liquid phosphates) used in the manufacture of polyisocyanurate foam construction board according to the present invention may be described with reference to the amount of isocyanate-reactive compound employed (e.g. polyol). For example, in one or more embodiments, at least 5, in other embodiments at least 10, and in other embodiments at least 12 parts by weight flame retardant per 100 parts by weight of polyol may be used. In these or other embodiments, at most 30, in other embodiments at most 25, and in other embodiments at most 20 parts by weight flame retardant per 100 parts by weight of polyol may be used. In one or more embodiments, from about 5 to about 30, in other embodiments from about 10 to about 25, and in other embodiments from about 12 to about 20 of flame retardant per 100 parts by weight of polyol may be used.

In one or more embodiments, the amount of catalyst(s) employed in practice of the present invention can be readily determined by the skilled person without undue experimentation or calculation. Indeed, the skilled person is aware of the various process parameters that will impact the amount of desired catalyst.

In one or more embodiments, the amount of physical blowing agent (i.e. pentane together with the amount of blowing agent additives) that is employed is sufficient to provide a foam having a foam density (ASTM C303-10) that is less than 2.5 pounds per cubic foot (12 kg/m$^2$), in other embodiments less than 2.0 pounds per cubic foot (9.8 kg/m$^2$), in other embodiments less than 1.9 pounds per cubic foot (9.3 kg/m$^2$), and still in other embodiments less than 1.8 pounds per cubic foot (8.8 kg/m$^2$). In one or more embodiments, the amount of blowing agent (together with the amount of blowing agent additives) that is employed is sufficient to provide a density that is greater than 1.50 pounds per cubic foot (7.32 kg/m$^2$), or in other embodiments, greater than 1.55 pounds per cubic foot (7.57 kg/m$^2$).

Chemical Blowing Agents

As suggested above, the construction boards of the present invention may be produced in the presence of a chemical blowing agent in addition to the physical blowing agents described above. The presence of excessive amounts of chemical blowing agents, such as water, has a deleterious impact on the overall balance of properties of the construction boards of the present invention. Accordingly, in one or more embodiments, the amount of chemical blowing agent employed in the manufacture of the construction boards of this invention, such as water, is limited. Accordingly, the amount of chemical blowing agent (e.g., water) included within the foam-forming ingredients according to the present invention, particularly the B-side stream of reactants) is less than 1.5, in other embodiments less than 1.3, in other embodiments less than 1.0, in other embodiments less than 0.8, in other embodiments less than 0.6, and in other embodiments less than 0.4 parts by weight chemical blowing agent (e.g., water) per 100 parts by weight of the isocyanate-reactive component (e.g., 100 parts by weight polyol, php).

The skilled person understands that the ingredients employed in the manufacture of polyurethane-polyisocyanurate foams in accordance with the present invention employs ingredients that inherently include water. Thus, unless efforts are made to remove water from the ingredients, certain levels of water are inherently introduced to the reaction mixture. It is conventionally believed that the amount of water inherently present within the reactants is about 0.15 to about 0.2 parts by weight water per 100 parts by weight polyol (php). Accordingly, the total amount of chemical blowing agent within the foam forming mixture includes the amount of inherent water within the reactants plus any added chemical blowing agent, such as added water. In one or more embodiments, chemical blowing agent, particularly water, may be added to the foam-forming ingredients while staying within the maximum amounts set forth above. For example, in one or more embodiments, from about 0.1 to about 0.8, in other embodiments from about 0.2 to about 0.7, and in other embodiments from about 0.25 to about 0.6 parts by weight water per 100 parts by weight polyol (php) may be added to the foam forming ingredients. In particular embodiments, the chemical blowing agent is added to the B-side stream of reactants.

Method of Making

An overview of a process of making the construction boards of the present invention can be described with reference to FIG. 1. The process 10 includes providing an A-side stream of reactants 12 and a B-side stream of reactants 14. As described above, the A-side stream of reactants includes an isocyanate-containing compounds and the B-side stream of reactants includes an isocyanate-reactive compound. A-side 12 and B-side 14 may be combined at mixhead 16.

In accordance with the present invention, a blowing agent additive 15 is included within the B-side stream. Also, in optional embodiments, a threshold amount of water 17 is included in the B-side. The order in which the ingredients are added in forming the B-side stream can be varied. And, the timing of the addition of the blowing agent additive can be varied. For example, in one or more embodiments, blowing agent additive is combined with the polyol 16 within a batch mixer together with one or more of the other ingredients except for the blowing agent. Once this initial mixture is prepared, blowing agent 21 can be added to the mixture to form the B-side stream. The skilled person will readily appreciate other orders of addition that can be employed. In other embodiments, blowing agent additive 15 can be introduced directly to mixhead 16, where it is simultaneously introduced to the A-side and B-side stream of reactants.

In one or more embodiments, the blowing agent additive (and optionally the threshold amount of water) is preblended with one or more constituents of the foam foaming ingredients. For example, the low molecular weight ester may be preblended with the hydrocarbon blowing agent (e.g., acyclic pentane) and the blend of the hydrocarbon and blowing agent additive is then introduced into the process for forming a foam as described herein.

In one or more embodiments, a blowing agent additive is introduced to the B-side stream of reactants by using an in-line continuous mixer at a pressure of less than 3,400 kPa, wherein the blowing agent additive and the polyol component are continuously charged in separate streams advanced at predetermined flow rates chosen to bring about a desired ratio of blowing agent additive to polyol component within the in-line mixer. In one or more embodiments, the blowing agent additive and the polyol are mixed at pressure of a less than 3,400 kPa to dissolve or emulsify the polyol and blowing agent additive within the B-side stream. Methods by which the blowing agent additive may be introduced to the B-side stream include those methods for introducing other constituents to the B-side stream, and in this regard, U.S. Publ. No. 2004/0082676 is incorporated herein by reference.

In one or more embodiments, a blowing agent additive is introduced to the B-side stream (i.e. combined with the polyol) prior to introducing the blowing agent to the B-side stream. In these or other embodiments, a blowing agent additive is introduced to the B-side stream (i.e. combined with the polyol) after introducing the blowing agent to the B-side stream. In these or other embodiments, a blowing agent additive is introduced to the B-side stream (i.e. combined with the polyol) simultaneously with the blowing agent. As suggested above, in alternate embodiments, which are also shown in FIG. 1, the blowing agent additive can be included in the A-side, either exclusively or in combination with addition to the B-side or in addition to inclusion at the mixhead.

The respective streams (12, 14) are mixed within, for example, a mixhead 16 to produce a reaction mixture. Embodiments of the present invention are not limited by the type of mixing or device employed to mix the A-side stream and the B-side stream. In one or more embodiments, the A-side stream of reactants and the B-side stream of reactants may be mixed within an impingement mixhead. In particular embodiments, mixing takes place at a temperature of from about 5 to about 45° C. In these or other embodiments, mixing takes place at a pressure in excess of 1,000, in other embodiments in excess of 1,500, and in other embodiments in excess of 2,000 psi.

The mixture can then be deposited onto a facer that is positioned within and carried by a laminator 18. While in laminator 18, the reaction mixture rises and can be married to a second facer to form a composite, which may also be referred to as a laminate, wherein the foam is sandwiched between upper and lower facers. The composite, while in laminator 18, or after removal from laminator 18, is exposed to heat that may be supplied by, for example, oven 20. For example, laminator 18 may include an oven or hot air source that heats the slats and side plates of the laminator and there through transfers heat to the laminate (i.e. to the reaction mixture).

Once subjected to this heat, the composite (i.e. the reaction mixture), or a portion of the composite (i.e. reaction mixture) can undergo conventional finishing within a finishing station 24, which may include, but is not limited to, trimming and cutting.

Construction Boards

Figure 2:
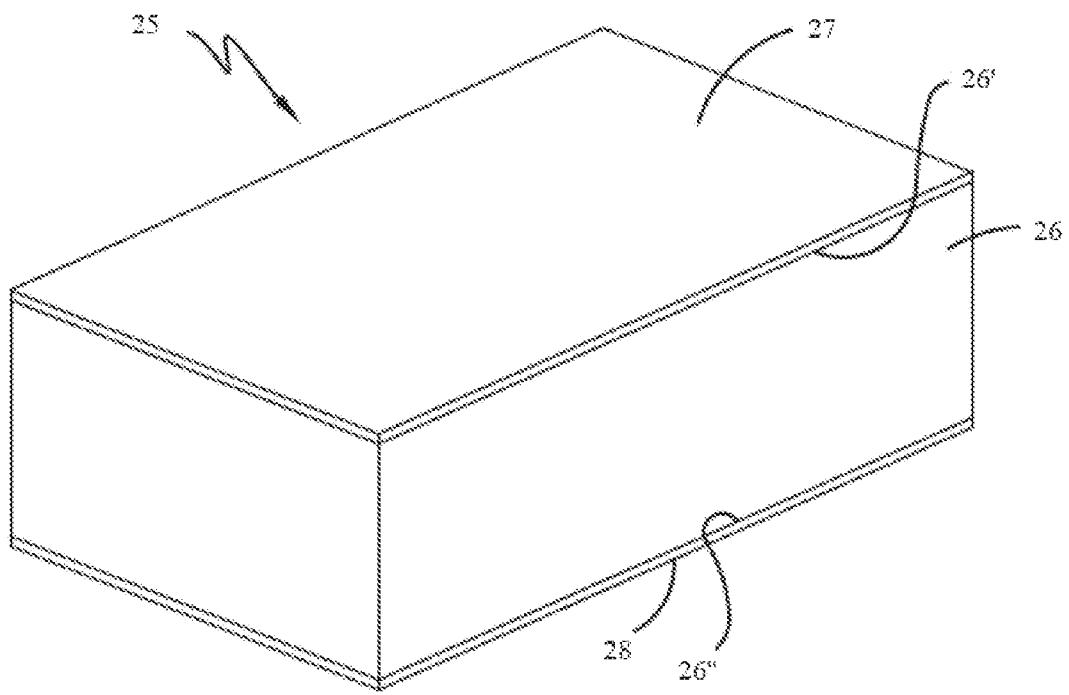
FIG. 2 is a perspective view of a construction board of one or more embodiments of the present invention.

Construction boards according to one or more embodiments of the present invention may be described with reference to FIG. 2., which shows a construction board that is indicated generally by the numeral 25. Construction board 25 includes a foam layer 26, which may be referred to as foam core 26 or foam body 26, sandwiched between first facer 27 and optional second facer 28. Facers 27 and 28 are attached to foam layer 26 at first planar surface 26' and second planar surface 26", respectively, of foam layer 26. In one or more embodiments, facer 27 (and optionally facer 28) are continuous over the entire planar surface 26' (or planar surface 26") of foam core 26. In one or more embodiments, the pentane and the blowing agent additive are contained within layer 26; for example, foam body may be a closed cell foam and at least one of or both of the pentane and the blowing agent additive may be contained within the cells, and/or at least one of or both of the pentane and blowing agent additive may be contained within the walls of the cellular structure.

Method of Improving R-Value

In one or more embodiments, the construction boards of the present invention have an R-Value at a median temperature of 40° F. that is at least 1%, in other embodiments at least 2%, in other embodiments at least 3%, in other embodiments at least 4%, in other embodiments at least 5%, and in other embodiments at least 6% greater than its R-Value at a median temperature of 75° F. In one or more embodiments, the construction boards include rigid, closed-cell polyisocyanurate construction boards having an index of at least 290, a density below 2.5 lbs/ft$^3$, and include a pentane blowing agent (e.g., acyclic pentane blowing agent) as defined herein. As the skilled person will appreciate, R-Value can be determined according to ASTM C518-10.

INDUSTRIAL APPLICABILITY

In one or more embodiments, the construction boards of this invention may be employed in roofing or wall applications. In particular embodiments, the construction boards are used in flat or low-slope roofing system.

Figure 3:
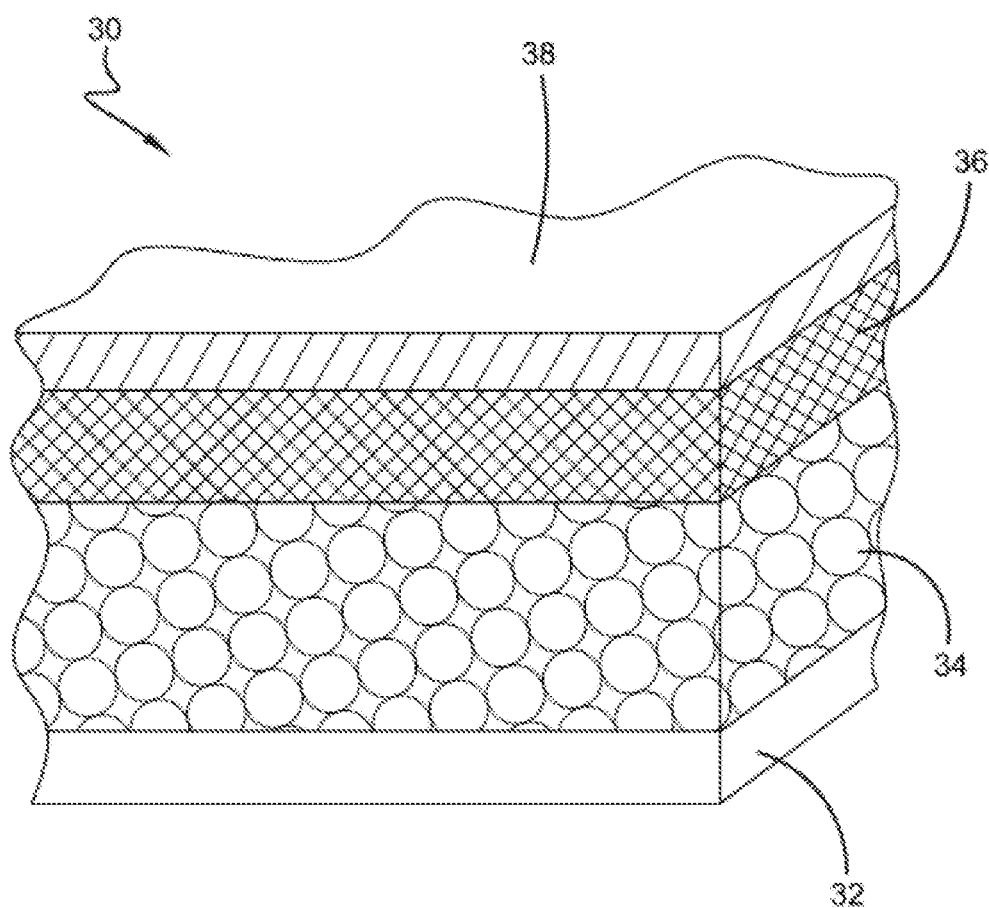
FIG. 3 is a perspective view of a roofing system including one or more construction boards according to practice of one or more embodiments of the present invention.

In one or more embodiments, a roofing system may be described with reference to FIG. 3, which shows a roof deck 32 having an insulation board 34, which may be fabricated according to practice of this invention, disposed thereon. An optional high density board 36 may be positioned above insulation board 34 relative to roof deck 32. A water-protective layer or membrane 38 is disposed on top or above high density board 36. In alternate embodiments, high density board 36 may be positioned below insulation board 34.

Practice of this invention is not limited by the selection of any particular roof deck. Accordingly, the roofing systems of this invention can include a variety of roof decks. Exemplary roof decks include concrete pads, steel decks, wood beams, and foamed concrete decks.

Practice of this invention is likewise not limited by the selection of any water-protective layer or membrane. As is known in the art, several membranes can be employed to protect the roofing system from environmental exposure, particularly environmental moisture in the form of rain or snow. Useful protective membranes include polymeric membranes. Useful polymeric membranes include both thermoplastic and thermoset materials. For example, and as is known in the art, membrane prepared from poly(ethylene-co-propylene-co-diene) terpolymer rubber or poly(ethylene-co-propylene) copolymer rubber can be used. Roofing membranes made from these materials are well known in the art as described in U.S. Pat. Nos. 6,632,509, 6,615,892, 5,700,538, 5,703,154, 5,804,661, 5,854,327, 5,093,206, and 5,468,550, which are incorporated herein by reference. Other useful polymeric membranes include those made from various thermoplastic polymers or polymer composites. For example, thermoplastic olefin (i.e. TPO), thermoplastic vulcanizate (i.e. TPV), or polyvinylchloride (PVC) materials can be used. The use of these materials for roofing membranes is known in the art as described in U.S. Pat. Nos. 6,502,360, 6,743,864, 6,543,199, 5,725,711, 5,516,829, 5,512,118, and 5,486,249, which are incorporated herein by reference. In one or more embodiments, the membranes include those defined by ASTM D4637-03 and/or ASTM D6878-03.

Still in other embodiments, the protective membrane can include bituminous or asphalt membranes. In one embodiment, these asphalt membranes derive from asphalt sheeting that is applied to the roof. These asphalt roofing membranes are known in the art as described in U.S. Pat. Nos. 6,579,921, 6,110,846, and 6,764,733, which are incorporated herein by reference. In other embodiments, the protective membrane can derive from the application of hot asphalt to the roof.

Other layers or elements of the roofing systems are not excluded by the practice of this invention. For example, and as is known in the art, another layer of material can be applied on top of the protective membrane. Often these materials are applied to protect the protective membranes from exposure to electromagnetic radiation, particularly that radiation in the form of UV light. In certain instances, ballast material is applied over the protective membrane. In many instances, this ballast material simply includes aggregate in the form of rock, stone, or gravel; U.S. Pat. No. 6,487,830, is incorporated herein in this regard.

The construction boards of this invention can be secured to a building structure by using various known techniques. For example, in one or more embodiments, the construction boards can be mechanically fastened to the building structure (e.g., the roof deck). In other embodiments, the construction boards can be adhesively secured to the building structure.

In order to demonstrate the practice of the present invention, the following examples have been prepared and tested. The examples should not, however, be viewed as limiting the scope of the invention. The claims will serve to define the invention.

EXAMPLES

Samples 1-10

The following foam formulations were made and combined at laboratory scale to produce foam samples that were then tested for various properties, as will be discussed in greater detail below. The foams were prepared from two ingredient mixtures that included an A-side mixture and a B-side mixture. The A-side mixture included a polymeric isocyanate based upon diphenyl methane diisocyanate. The B-side mixture included 100 parts by weight aromatic polyester polyol, about 10 parts by weight liquid flame retardant, about 3 parts by weight metal carboxylate catalyst, about 0.3 parts by weight amine catalyst, about 2 parts by weight surfactant, about 0.25 parts by weight added water, and a physical blowing agent blend that included isopentane, n-pentane, and an organic compound (e.g. a blowing agent additive in accordance with this invention). The amount of the isopentane, the n-pentane, and the identity and amount of the organic compound are provided in Table I. The A-side mixture and the B-side mixture were combined in relative amounts to provide foam having an index of 287. The amount of physical blowing agent, together with the amount of water that was believed to be inherent within the ingredients and the amount of added water, were tailored to provide foams having a density of about 1.6 lbs/ft$^3$.

TABLE I

| Blowing Agent Additive | Samples | | | | | | | | | |
|---|---|---|---|---|---|---|---|---|---|---|
| | 1 N/A | 2 Hexane | 3 Methyl Ethyl Ketone | 4 Methyl Formate | 5 Chloroform | 6 Methylal | 7 Acetone | 8 Toluene | 9 Ethyl Acetate | 10 THF |
| Boiling Point (° C.) | N/A | 68 | 79.6 | 31.8 | 61.2 | 42 | 56 | 110.6 | 77 | 66 |
| Hansen Factor (MPa$^{-0.5}$) | N/A | 14.9 | 19.0 | 18.7 | 19.0 | 17.5 | 20.0 | 18.2 | 18.1 | 19.4 |
| R-Value (hr · ° F. · ft$^2$/Btu · in) | | | | | | | | | | |
| 75° F. | 6.492 | 6.062 | 6.588 | 6.571 | 6.729 | 6.608 | 6.664 | 6.553 | 6.544 | 6.609 |
| 40° F. | 5.626 | 5.417 | 7.032 | 6.938 | 6.966 | 6.835 | 7.107 | 7.065 | 7.062 | 7.024 |
| % Change | −13 | −11 | +7 | +6 | +4 | +3 | +7 | +8 | +8 | +6 |

R-value was determined according to ASTM C518. Short-term dimensional stability was determined according to ASTM D-2126-09 modified for using smaller sample size of 2"×2"×4". Compression strength was determined according to ASTM D-1621-10.

peratures. Table II also provides the compressive strength measured in the rise direction (y direction) and a direction perpendicular to the rise direction (i.e. the x direction). Further, Table II provides the short-term dimensional stability represented as a percent change in volume.

TABLE II

| | Samples | | | | | | |
|---|---|---|---|---|---|---|---|
| | 11 | 12 | 13 | 14 | 15 | 16 | 17 |
| Physical Blowing Agent (php) | | | | | | | |
| Acetone | 0 | 0.70 | 1.96 | 3.30 | 5.00 | 5.80 | 9.67 |
| Isopentane | 13.20 | 12.27 | 11.66 | 11.77 | 10.29 | 9.13 | 6.60 |
| N-Pentane | 10.8 | 10.03 | 9.54 | 9.63 | 8.41 | 7.47 | 5.40 |
| Acetone (mole %) | 0 | 4 | 10 | 16 | 25 | 30 | 50 |
| Acetone (wt %) | 0 | 3 | 8 | 13 | 21 | 26 | 45 |
| R-Value | | | | | | | |
| 75° F. | 6.492 | 6.616 | 6.608 | 6.643 | 6.490 | 6.567 | 6.521 |
| 40° F. | 5.626 | 6.419 | 6.718 | 6.846 | 6.913 | 7.139 | 7.153 |
| % Change | −13 | −3.0 | 1.7 | 3.1 | 6.5 | 8.7 | 9.7 |
| Compressive Strength | | | | | | | |
| x-direction | 32.3 | 37.0 | 35.4 | 42.6 | 29.6 | 32.5 | 24.1 |
| y-direction | 13.4 | 15.1 | 14.0 | 11.3 | 11.5 | 10.6 | 7.66 |
| Short-Term Dimensional Stability | | | | | | | |
| % Volume Change | −0.80 | −0.79 | −0.69 | −0.47 | — | −0.74 | −6.41 |

The data in Table I shows that the inclusion of certain organic compounds having a solubility parameter greater than 17.0 MPa into the physical blowing agent mixture improved the R-Value at a median temperature of 40° F. relative to the R-Value at a median temperature of 75° F. over those foams where the physical blowing agent simply included pentane (i.e. Sample 1). This result was highly unexpected. Furthermore, Table I shows that the inclusion of an organic compound not having the requisite solubility parameter (i.e. hexane of Sample 2) did not result in an improvement in the R-Value at a median temperature of 40° F. relative to the R-Value at a median temperature of 75° F.

Samples 11-17

Using the foam forming technique and general formulation described above for Samples 1-10, additional foam samples were prepared using acetone as the blowing agent additive at various levels. The amount of acetone employed in each sample, together with the amount of isopentane and n-pentane employed in each sample, is set forth in Table II together with the initial R-value obtained at median temperatures of 75° F. and 40° F. Table II also provides the percentage change in R-value between these median tem- The data in Table II shows that the moles of blowing agent additive relative to the moles of total physical blowing agent (i.e. the total moles of blowing agent additive and total moles of pentane) is critical to achieving an improved R-Value at a median temperature of 40° F. relative to the R-Value at a median temperature of 75° F. The data in Table II also shows that limiting the amount of blowing agent additive relative to the amount of total physical blowing agent is also critical to maintaining adequate dimensional stability.

Samples 18-25

Using the foam forming technique and general formulation described above for Samples 11-17, additional foam samples were prepared using acetone as the blowing agent together with isopentane, n-pentane, or cyclopentane, as shown in Table III. Table III also provides the percentage change in R-value between the relevant median temperatures, as well as the compressive strength measured in the rise direction (y direction) and a direction perpendicular to the rise direction (i.e. the x direction).

TABLE III

| | Samples | | | | | | | |
|---|---|---|---|---|---|---|---|---|
| | 18 | 19 | 20 | 21 | 22 | 23 | 24 | 25 |
| Physical Blowing Agent (php) | | | | | | | | |
| Acetone | 3.30 | 3 | 2.9 | 2.9 | 5.00 | 4.8 | 4.8 | 4.8 |
| Isopentane | 11.77 | 20.3 | | | 10.29 | 18.0 | | |
| N-Pentane | 9.63 | | 20.4 | | 8.41 | | 18.0 | |
| Cyclopentane | | | | 20.4 | | | | 18.0 |
| Acetone (mole %) | 16 | 16 | 15 | 15 | 25 | 25 | 25 | 25 |
| Acetone (wt %) | 13.0 | 13.0 | 12.4 | 12.4 | 21.0 | 21.0 | 21.2 | 21.2 |
| R-Value | | | | | | | | |
| 75° F. | 6.643 | 6.631 | 6.462 | 7.087 | 6.490 | 6.536 | 6.544 | 7.160 |
| 40° F. | 6.846 | 6.979 | 6.928 | 7.057 | 6.913 | 7.118 | 6.945 | 7.407 |
| % Change | 3.1 | 5.2 | 7.2 | −0.4 | 6.5 | 8.9 | 6.1 | 3.4 |
| Compressive Strength | | | | | | | | |
| x-direction | 42.6 | 31.7 | 28.7 | 31.3 | 23.6 | 29.3 | 30 | 30.9 |
| y-direction | 11.3 | 12 | 10.1 | 9.42 | 11.5 | 10.1 | 9.59 | 7.59 |

The data in Table III shows that the improvement in R-Value, deriving from the use of a blowing agent additive, at a 40° F. median temperature relative to the R-Value at a 75° F. median temperature is markedly greater where the physical blowing agent is an acyclic pentane (i.e. isopentane or n-pentane) as compared to cyclopentane. These results were unexpected.

Various modifications and alterations that do not depart from the scope and spirit of this invention will become apparent to those skilled in the art. This invention is not to be duly limited to the illustrative embodiments set forth herein.

What is claimed is:

1. A construction board comprising:
   (i) a foam body having a generally planar shape with first and second planar surfaces, where said foam body is a closed-cell foam body including an acyclic pentane and a blowing agent additive contained within the foam body, where the blowing agent additive has a Hansen Solubility Parameter of from 17.0 to 35.0 MPa-0.5, where the blowing agent additive has a boiling point, at one atmosphere, of less than 150° C., where said blowing agent additive is selected from the group consisting of ketones, aldehydes, ethers, esters, halogenated hydrocarbons, and aromatics, where the acyclic pentane and the blowing agent additive form a physical blowing agent mixture, where the physical blowing agent mixture includes from about 7 to about 35 mole % of the blowing agent additive based on the total moles of physical blowing agent mixture, where the closed-cell body is a polyurethane or polyisocyanurate foam body prepared by reacting an isocyanate-containing compound with an aromatic polyester polyol, and where the isocyanate-containing compound and the aromatic polyester polyol are reacted at a molar ratio to provide an iso index of at least 220; and
   (ii) first and second facers attached to said first and second planar surfaces, respectively.

2. The construction board of claim 1, where the foam body has a density of 1.0 to 2.5 lbs/ft$^3$.

3. The construction board of claim 1, where the foam body has an index of at least 225 and a density of 1.2 to 2.2 lbs/ft$^3$.

4. The construction board of claim 1, where the blowing agent additive has a Hansen Solubility Parameter of from 17.5 to 28.0 MPa$^{-0.5}$.

5. The construction board of claim 1, where the blowing agent additive has a Hansen Solubility Parameter that is greater than 19.0 MPa$^{-0.5}$.

6. The construction board of claim 1, where the blowing agent additive has a boiling point, at one atmosphere, of greater than 5° C.

7. The construction board of claim 1, where blowing agent additive and the acyclic pentane are provided in amounts to provide a molar ratio of the blowing agent additive to the acyclic pentane of from about 1:20 to about 1:1.

8. The construction board of claim 1, where blowing agent additive and the acyclic pentane are provided in amounts to provide a molar ratio of the blowing agent additive to the acyclic pentane of from about 1:4 to about 2:1.

9. The construction board of claim 1, where the acyclic pentane and the blowing agent additive form a physical blowing agent mixture, and where the physical blowing agent mixture includes from about 10 to about 30 mole % of the blowing agent additive based on the total moles of physical blowing agent mixture.

10. The construction board of claim 1, where the blowing agent additive is an aldehyde or a ketone.

11. The construction board of claim 1, where the blowing agent additive is an ester.

12. The construction board of claim 1, where the blowing agent additive is an ether.

13. The construction board of claim 1, where the blowing agent additive is a halogenated hydrocarbon.

14. The construction board of claim 1, where the blowing agent additive is an aromatic compound.

* * * * *